US009952460B2

(12) United States Patent
Yang et al.

(10) Patent No.: US 9,952,460 B2
(45) Date of Patent: Apr. 24, 2018

(54) DISPLAY DEVICE AND METHOD OF FABRICATING THE SAME

(71) Applicant: ELECTRONICS AND TELECOMMUNICATIONS RESEARCH INSTITUTE, Daejeon (KR)

(72) Inventors: Jong-Heon Yang, Daejeon (KR); Jae Bon Koo, Daejeon (KR); Byoung-Hwa Kwon, Daejeon (KR); Gi Heon Kim, Daejeon (KR); Yong Hae Kim, Daejeon (KR); Hojun Ryu, Seoul (KR); Chan Woo Park, Daejeon (KR); Chunwon Byun, Daejeon (KR); Hyunkoo Lee, Daejeon (KR); Jong Tae Lim, Seoul (KR); Kyoung Ik Cho, Daejeon (KR); Seong-Mok Cho, Daejeon (KR); Hye Yong Chu, Daejeon (KR); Chi-Sun Hwang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 99 days.

(21) Appl. No.: 15/010,968

(22) Filed: Jan. 29, 2016

(65) Prior Publication Data

US 2016/0246116 A1 Aug. 25, 2016

(30) Foreign Application Priority Data

Feb. 23, 2015 (KR) ........................ 10-2015-0025358

(51) Int. Cl.
*G02F 1/1333* (2006.01)
*G02F 1/1335* (2006.01)

(52) U.S. Cl.
CPC .................. *G02F 1/133308* (2013.01); *G02F 2001/133317* (2013.01); *G02F 2001/133616* (2013.01); *G02F 2201/44* (2013.01)

(58) Field of Classification Search
CPC ................................................ G02F 1/133308
(Continued)

(56) References Cited

U.S. PATENT DOCUMENTS 6,372,608 B1 4/2002 Shimoda et al.
6,771,327 B2 * 8/2004 Sekiguchi ........... G02F 1/13338 345/104

(Continued)

FOREIGN PATENT DOCUMENTS

KR 10-2004-0097228 A 11/2001
KR 10-2012-0139076 A 12/2012

(Continued)

OTHER PUBLICATIONS

Uiyeong Cha, et al., "Transflective Liquid Crystal Display using Cholesteric Liquid Crystal Film", IMID/IDMC/ASIA Display 2010 Digest, 2010, pp. 711-712, vol. P2-7.

*Primary Examiner* — James Dudek

(57) ABSTRACT

Provided is a display device. The display device includes a lower display element where a substrate, a first lower electrode, a liquid crystal part, and a second lower electrode are sequentially stacked, an upper display element stacked vertical to the lower display element, where a first upper electrode, a light emitting part, a second upper electrode, and a protective part are sequentially stacked, and a middle part configured to deliver a driving signal to the lower and upper display elements, between the lower and upper display elements.

16 Claims, 12 Drawing Sheets

(58) Field of Classification Search
USPC .................................................... 349/83, 74
See application file for complete search history.

(56) References Cited

U.S. PATENT DOCUMENTS

| | | | | |
|---|---|---|---|---|
| 7,599,025 | B2 | 10/2009 | Yeh et al. | |
| 8,411,235 | B1 * | 4/2013 | Barnidge | G02B 27/22 349/112 |
| 2003/0193457 | A1 * | 10/2003 | Wang | G09G 3/20 345/84 |
| 2007/0024794 | A1 * | 2/2007 | Kim | G02F 1/13452 349/152 |
| 2008/0106673 | A1 * | 5/2008 | Okuda | G02B 6/002 349/65 |
| 2012/0320287 | A1 | 12/2012 | Kim et al. | |
| 2013/0314633 | A1 | 11/2013 | Koo et al. | |
| 2013/0314634 | A1 | 11/2013 | Koo et al. | |
| 2014/0284563 | A1 | 9/2014 | Baek et al. | |
| 2015/0160511 | A1 | 6/2015 | Kim et al. | |

FOREIGN PATENT DOCUMENTS

| | | | |
|---|---|---|---|
| KR | 10-2014-0115194 | A | 9/2014 |
| KR | 10-1458699 | B1 | 11/2014 |
| KR | 10-2015-0066852 | A | 6/2015 |

* cited by examiner 300
355
330
320
310
350
360
365
225
230b
240
215
230c
235
220
210
230a
PERI
PXL
PERI
TFT_2
TFT_1
130
125
115
135
120
110
105
345
340
200
100

300
355
330
320
310
350
PERI
PXL
PERI
225
230b
240
215
230c
235
220
210
230a
360
115 125
TFT_2
TFT_1
LASER
345
340
430
420
410
400
200

DISPLAY DEVICE AND METHOD OF FABRICATING THE SAME

CROSS-REFERENCE TO RELATED APPLICATIONS

This U.S. non-provisional patent application claims priority under 35 U.S.C. § 119 of Korean Patent Application No. 10-2015-0025358, filed on Feb. 23, 2015, the entire contents of which are hereby incorporated by reference.

BACKGROUND

The present disclosure herein relates to a display device and a method of fabricating the same, and more particularly, to a display device including a reflective type display element and a light emissive type display element and a method of fabricating the same.

Currently released displayed devices are emissive types and reflective types. Emissive type display devices have excellent image qualities in dark environments but require high power consumption in order to provide sufficient brightness in bright environments such as outside a building during the day. Additionally, emissive type display devices have image qualities, which are deteriorated in bright environments by the refection of an external light source. However, reflective type display devices provide visibility comfortable for the human eyes in bright environments and consume less power but provide less visibility in dark environments.

A side-by-side structure in which a light emissive type pixel and a reflective type pixel are spaced horizontal to the upper of a substrate is implemented currently but since a display device of different materials and structures are implemented on the same substrate, the processes are complex and difficult. Additionally, after the forming of a light emissive type display device and a reflective type display device, a method of transferring them may be used but it is difficult to bond the substrates and drive them simultaneously.

SUMMARY

The present disclosure provides a display device for simultaneously implementing highly efficient and thin film type light emissive and reflective type display elements.

The present disclosure also provides a method of fabricating the display device.

An embodiment of the inventive concept provides display device including: a lower display element where a substrate, a first lower electrode, a liquid crystal part, and a second lower electrode are sequentially stacked; an upper display element stacked vertical to the lower display element, where a first upper electrode, a light emitting part, a second upper electrode, and a protective part are sequentially stacked; and a middle part configured to deliver a driving signal to the lower and upper display elements, between the lower and upper display elements.

In an embodiment, the upper display element may further include banks for defining a space where the light emitting part is disposed; and the protective part disposed on the banks and covers a pixel area where the light emitting part is disposed.

In an embodiment, the protective part may cover the entire upper display element.

In an embodiment, the protective part may have a flat or can-type structure.

In an embodiment, the display device may further include a thin film type encapsulation layer between the protective part and an upper part of the upper display element.

In an embodiment, the display device may further include a hardener for filling an empty space between the thin film type encapsulation layer and an upper part of the upper display element.

In an embodiment, one surface of the first lower electrode and one surface of the second lower electrode may be exposed and the exposed surfaces of the first and second lower electrodes may be disposed in a peripheral area.

In an embodiment, one surface of the first upper electrode may be exposed and the exposed surface of the first upper electrode is disposed in the peripheral area. The display device may further include a pad part electrically connected to the second upper electrode, wherein one surface of the pad part may be exposed and the exposed surface of the pad part may be disposed in the peripheral area.

In an embodiment, the exposed surfaces of the first and second lower electrodes and the exposed surface of the first upper electrode and the exposed surface of the pad part may be exposed toward an upper surface of the display device.

In an embodiment, side surfaces of the first lower electrode may be exposed; one surface of the second lower electrode may be exposed; and the exposed portions of the first and second lower electrodes may be disposed in a peripheral area.

In an embodiment, the display device may further include: a first pad part electrically connected to the first upper electrode, one surface of the first pad being exposed; and a second pad part electrically connected to the second upper electrode, one surface of the second pad part being exposed.

In an embodiment, the exposed portions of the first and second lower electrodes and one surfaces of the first and second pads may face a bottom surface of the display device.

In an embodiment of the inventive concept, a method of fabricating a display device includes: sequentially forming a separation layer, a heat prevention layer, and an etch stop layer on a sacrificial substrate; forming a middle part including a passivation layer, a driving circuit, and an interlayer insulation layer on the etch stop layer; forming an upper display element including a first upper electrode, a light emitting part, a second upper electrode, and a protective part on the middle part; removing the sacrificial substrate by using laser; removing the separation layer, the heat prevention layer, and the etch stop layer; and coupling a lower display element including a first lower electrode, a liquid crystal part, and a second lower electrode to below the middle part.

In an embodiment, the separation layer may include at least one of amorphous silicon including hydrogen, a silicon oxide, a silicon nitride, and polyimide, wherein the heat prevention layer may include a silicon oxide; and the etch stop layer may include at least one of Mo, Al, Ti, and Cr.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
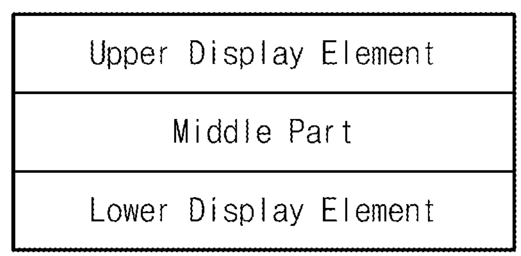
FIG. 1 is a schematic block diagram illustrating a display device according to an embodiment of the inventive concept.

Purposes, other purposes, features, and advantages of the inventive concept will be easily understood through preferred embodiments relating to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

It will also be understood that when a layer (or film) is referred to as being 'on' another layer or substrate, it can be directly on the other layer or substrate, or intervening layers may also be present. Additionally, in the drawings, the thicknesses of components are exaggerated for effective description.

Additionally, embodiments described in this specification will be described with plan views and/or sectional views, that is, ideal exemplary views of the inventive concept. In the drawings, the thicknesses of a layer and an area are exaggerated for effective description. Accordingly, shapes of the exemplary views may be modified according to fabricating techniques and/or allowable errors. Therefore, the embodiments of the inventive concept are not limited to the specific shape illustrated in the exemplary views, but may include other shapes that may be created according to fabricating processes. For example, an etched region illustrated as a rectangle may have rounded or curved features. Therefore, areas exemplified in the drawings have general properties, and are used to illustrate a specific shape of an element region. Thus, this should not be construed as limited to the scope of the inventive concept. It will be understood that the terms "first" and "second" are used herein to describe various components but these components should not be limited by these terms. These terms are just used to distinguish a component from another component. Embodiments described herein include complementary embodiments thereof.

The terms used in this specification are used only for explaining specific embodiments while not limiting the inventive concept. The terms of a singular form may include plural forms unless referred to the contrary. The meaning of "comprises," and/or "comprising" in this specification specifies the mentioned component but does not exclude at least one another component.

Hereinafter, embodiments of the inventive concept are described in more detail with reference to the accompanying drawings.

FIG. 1 is a schematic block diagram illustrating a display device according to an embodiment of the inventive concept.

Referring to FIG. 1, in relation to the display device, a lower display element, a middle part, and an upper display element may be stacked sequentially.

The lower display element may include an emissive type display element or a reflective type display element. The upper display element may include an emissive type display element or a reflective type display element. As one example, when the lower display element includes a reflective type display element. The upper display element may include an emissive type display element, and vice versa.

The light emissive display element may include at least one of a light emitting diode such as an organic light emitting diode (OLED) and a polymer LED (PLED), inorganic electro luminance (EL), and a plasma display panel (PDP).

The reflective type display element may include at least one of liquid crystal, an electronic paper display (EPD), an Electrochromic (EC) display, and a Qualcomm' MIRASOL® display.

According to one aspect of the inventive concept, when the display device is an active matrix driving display device, the middle part may include a thin film transistor (TFT). According to another aspect of the inventive concept, when the display device is a passive matrix driving display device, the middle part may include a passivation layer and an interlayer insulation layer.

Hereinafter, a light emissive type display element is applied as the upper display element and a reflective type display element is applied as the lower display element. This will be described below. Additionally, the display device is described by using an active matrix driving display device as an example. However, the inventive concept is not limited thereto.

Figure 2:
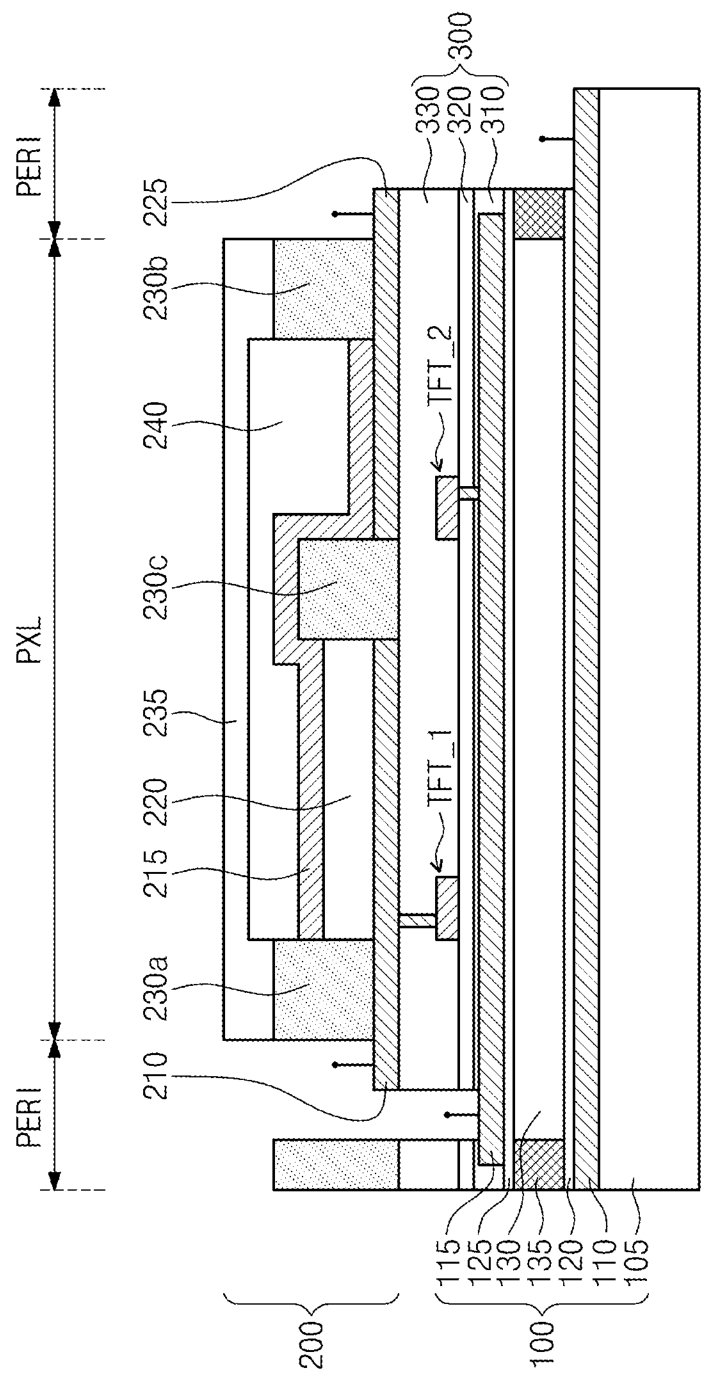
FIG. 2 is a sectional view illustrating a display device according to an embodiment of the inventive concept.

FIG. 2 is a sectional view illustrating a display device according to an embodiment of the inventive concept.

Referring to FIG. 2, the display device may include an upper display element 200, a lower display element 100, and a middle part 300 disposed between the upper and lower display elements 100 and 200. In this embodiment, an OLED is applied as the upper display element 200 and an LCD is applied as the lower display element 100. This will be described exemplarily.

The display device may include a pixel area PXL and a peripheral area PERI. As one example, the pixel area PXL is disposed at the center portion of the display device and the peripheral area PERI may be disposed at the end portion of the display device and surround the pixel area PXL.

The lower display element 100 may include a first lower electrode 110, a liquid crystal part 130, and a second lower electrode 115, which are sequentially stacked on a substrate 105.

The substrate 105, as a transparent substrate, may include glass or plastic.

The first lower electrode 110 may function as a cathode of the lower display element 100. The first lower electrode 110 may cover the pixel area PXL and its at least one side may extend toward the peripheral area PERI to be electrically connected to an external circuit. The first lower electrode 110 extending toward the peripheral area PERI may be exposed to be connected to the external circuit. Referring to FIG. 2, the first lower electrode 110 may completely cover the peripheral area PERI in addition to the pixel area PXL. Furthermore, a portion of the first lower electrode 110 extending toward the peripheral area PERI may be exposed. According to one aspect of the inventive concept, the first lower electrode 110 may be a transparent electrode. For example, the first lower electrode 110 may include at least one of indium tin oxide (ITO), indium zinc oxide (IZO), Al-doped zinc oxide (AZO), ZnO, $SnO_2$, $In_2O_3$, metal mash, and graphene.

The second lower electrode 115 may function as an anode of the lower display element 100 and may be spaced facing the first lower electrode 110 and disposed. The second lower electrode 115 may cover the pixel area PXL and its at least one side may extend toward the peripheral area PERI to be electrically connected to an external circuit. The second lower electrode 115 extending toward the peripheral area PERI may be exposed to be connected to the external circuit. Referring to FIG. 2, the second lower electrode 115 may cover at least a portion of the peripheral area PERI and a portion of the second lower electrode 115 extending toward the peripheral area PERI may be exposed. According to one aspect of the inventive concept, the second lower electrode 115 may be a transparent electrode. For example, the second lower electrode 115 may include at least one of ITO, IZO, AZO, ZnO, $SnO_2$, $In_2O_3$, metal mash, and graphene.

The liquid crystal part 130 may fill a space defined by a sealant 135, between the first and second lower electrodes 110 and 115. The liquid crystal part 130 may include a plurality of liquid crystals. The sealant 135 may be formed in the peripheral area PERI.

According to an embodiment of the inventive concept, the lower display element 100 may further include a first alignment layer 120 between the first lower electrode 110 and the liquid crystal part 130 and a second alignment layer 125 between the second lower electrode 115 and the liquid crystal part 130. The first and second alignment layers 120 and 125 may serve to help liquid crystals in the liquid crystal part 130 to be arranged in a desired direction. Each of the first and second alignment layers 120 and 125 may include polyimide. In this case, the liquid crystal part 130 may fill a space defined by the first and second alignment layers 120 and 125 and the sealant 135.

The upper display element 200 may include a first upper electrode 210, a light emitting part 220, a second upper electrode 215, and a protective part 235, which are sequentially stacked.

The first upper electrode 210 may function as an anode of the upper display element 200. The first upper electrode 210 may be disposed facing the second lower electrode 115 (functions as an anode of the lower display element 100). According to one aspect of the inventive concept, the first upper electrode 210 may partially cover the pixel area PXL and extend toward the peripheral area PERI. Referring to FIG. 2, the first upper electrode 210 may extend toward the left peripheral area PERI and a portion of the extended first upper electrode 210 may be exposed. The exposed first upper electrode 210 may be electrically connected to an external circuit. According to one aspect of the inventive concept, the first upper electrode 210 may be a transparent electrode. The first upper electrode 210 may include at least one of ITO, IZO, AZO, ZnO, $SnO_2$, $In_2O_3$, metal mash, and graphene.

The second upper electrode 215 may function as a cathode electrode of the upper display element 200 and may be spaced facing the first upper electrode 210 and disposed. The first upper electrode 215 may include at least one of a metal thin layer such as an Al and Mg alloy, or a transparent electrode such as a metal ITO, IZO, AZO, ZnO, $SnO_2$, $In_2O_3$, metal mash, and grapheme, or a polymer electrode such as conductive PEDOT: PSS(poly(3,4-ethylenedioxythiophene): polystyrene sulfonate). As one example, the second upper electrode 215 may work function properties for easy electron injection and may be a transparent electrode.

The second upper electrode 215 may cover at least a portion of the pixel area PXL. In this embodiment, the second upper electrode 215 may be disposed in an area defined by pixel banks 230*a* and 230*b* that define a unit pixel. The pixel banks 230*a* and 230*b* may be disposed in the pixel area PXL. As one example, the boundary of the peripheral area PERI and the pixel area PXL may be a plane that is identical to the outer surface of each of the pixel banks 230*a* and 230*b*.

In this embodiment, in order to connect the second upper electrode 215 to an external circuit electrically, the upper display element 200 may further include a pad part 225. The pad part 225 may contact one side of the second upper electrode 215 in the pixel area PXL and the pad part 225 contacting the second upper electrode 215 may extend toward the peripheral area PERI. Referring to FIG. 2, the pad part 225 may extend toward the peripheral area PERI and a portion of the extended pad part 225 may be exposed. The pad part 225 exposed may be electrically connected to an external circuit. According to one aspect of the inventive concept, the pad part 225 is disposed at the same height as the first upper electrode 210 but due to a separation bank 230*c*, the first upper electrode 210 and the pad part 225 may be cut physically.

The light emitting part 220 may fill a space defined by one of the pixel banks 230*a* and 230*b* and the separation bank 230*c* and disposed between the first and second upper electrodes 210 and 215. The light emitting part 220 may include a light emitting layer (not shown) formed of an organic low-molecular material such as anthracene and Alq3 or an organic high-molecular material such as poly(p-phenylenevinylene) (PPV), poly(p-phenylene) (PPP), and polythiophene (PT). As one example, the light emitting part 220 may be formed of a single layer of the light emitting layer. As another example, in order to improve the efficiency of the light emitting part 220, the light emitting part 220 may be configured using a hole injection layer (not shown), a hole transport layer (not shown), the light emitting layer, an electron transport layer (not shown), and an electron injection layer (not shown).

The protective part 235 may be disposed on the second upper electrode 215 to protect the upper display element 200. According to one aspect of the inventive concept, the protective part 235 may be supported by the pixel banks 230*a* and 230*b*.

The protective part 235 may include flat glass or can-type glass or may be a film-type substrate. A thin film encapsulation layer (not shown) may be added between the protective part 235 and the second upper electrode 215 and an empty space between the thin film encapsulation layer and the second upper electrode 215 may be filled with a hardener.

The middle part 300 may include a driving circuit for driving the upper and lower display elements 100 and 200 between the upper display element 200 and the lower display element 100. Additionally, the middle part 300 may include a passivation layer 320 and an interlayer insulation layer 330 stacked between the second lower electrode 115 of the lower display element 100 and the first upper electrode 210 of the upper display element 200.

The passivation layer 320 may be layer for preventing a byproduct (for example, water or gas) generated from the lower display element 100 from moving toward the upper display element 200. The passivation layer 320 may include at least one of SiOx, SiNx, $Al_2O_3$, and HfSiOx.

According to an embodiment of the inventive concept, the middle part 300 may further include a flat insulation layer 310 between the passivation layer 320 and the second lower electrode 115, in order to compensate for a level difference occurring between the second lower electrode 115 and the second alignment layer 125.

The driving circuit may be disposed on the passivation layer 320. The driving circuit may include at least one of a switching element for pixel selection, a device for operation mode selection, a capacitor, a capacitor electrode, a data electrode, a gate electrode, a column selection electrode, and a mode selection preference electrode. Referring to FIG. 2, a first TFT TFT_1 for delivering electrical signals to the first upper electrode 210 and a second TFT TFT_2 for delivering operating voltage to the second lower electrode 115 are exemplarily illustrated as the driving circuit.

The interlayer insulation layer 330 may cover the driving circuit, on the passivation layer 320. The interlayer insulation layer 330 may electrically separate the lower display element 100 from the upper display element 200. For example, the interlayer insulation layer 300 may include a nitride such as SiNx, an oxide such as SiOx, or an organic insulation material.

According to this embodiment, the first and second lower electrodes 110 and 115 and the first and second upper electrodes 210 and 215 may be exposed in the same direction substantially in order to be electrically connected to an external circuit. According to one aspect of the inventive concept, the first and second lower electrodes 110 and 115 and the first and second upper electrodes 210 and 215 may be exposed to the upper surface of the display device. In order for such a structure, the protective part 235 of the upper display element 200 may not cover the display device completely.

As one middle part 300 drives the upper and lower display elements 100 and 200 together, an incidental middle part 300 may be omitted, so that the entire thickness of the display device may be reduced. Additionally, image distortion due to an optical gap between the upper and lower display elements 100 and 200 is reduced by the omitted incidental middle part 300, so that the image quality of the display device may be improved. Furthermore, the cost of fabricating the display device may be reduced.

Figure 3:
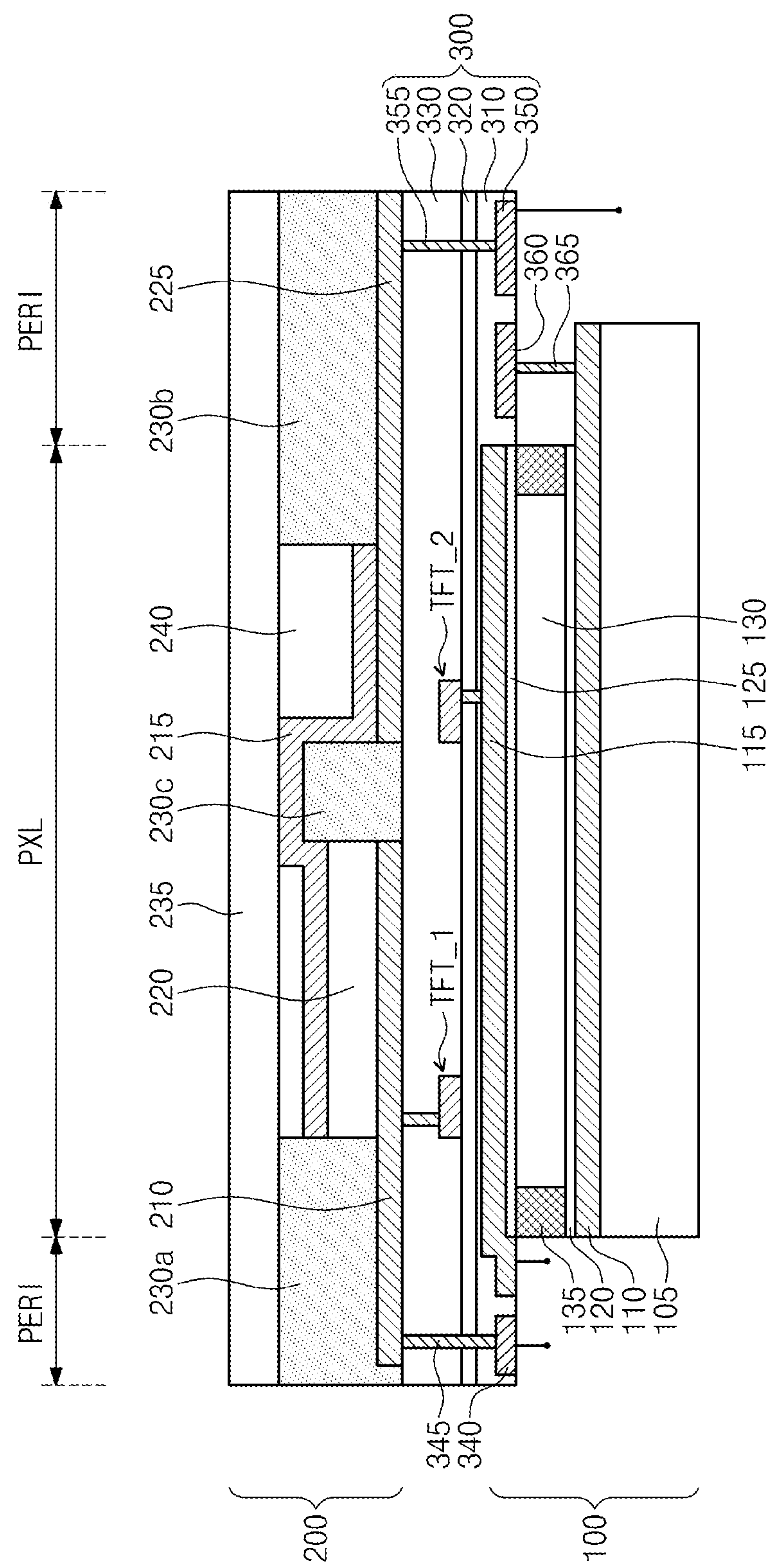
FIG. 3 is a sectional view illustrating a display device according to another embodiment of the inventive concept.

FIG. 3 is a sectional view illustrating a display device according to another embodiment of the inventive concept.

Referring to FIG. 3, the display device may include an upper display element 200, a lower display element 100, and a middle part 300 disposed between the upper and lower display elements 100 and 200.

The lower display element 100 may include a first lower electrode 110, a liquid crystal part 130, and a second lower electrode 115, which are sequentially stacked on a substrate 105. Additionally, the lower display element 100 may further include a first alignment layer 120 between the first lower electrode 110 and the liquid crystal part 130 and a second alignment layer 125 between the liquid crystal part 130 and the second lower electrode 115. Referring to FIG. 3, the substrate 105, the first lower electrode 110, the first alignment layer 120, and the second alignment layer 125 may have the same width substantially. The liquid crystal part 130 may include liquid crystal for filling a sealant 135 disposed between the first and second alignment layers 120 and 125. According to this embodiment, the second lower electrode 115 may extend from the upper surface of the second alignment layer 125 to cover one side surface of the second alignment layer 125. A portion extending from the second lower electrode 115 to cover one side surface of the second alignment layer 125 may have the same flat bottom surface as the middle part 300. Additionally, the portion of the second lower electrode 115 may be exposed to be electrically connected to an external circuit.

The upper display element 200 may include a first upper electrode 210, a light emitting part 220, a second upper electrode 215, and a protective part 235, which are sequentially stacked. Additionally, the upper display element 200 may further include a first pad part 225 contacting the second upper electrode 215, pixel banks 230*a* and 230*b* for defining a unit pixel, and a separation bank 230*c* for separating the first upper electrode 210 from the first pad part 225. According to this embodiment, the protective part 235 may be disposed completely covering the peripheral area PERI from the pixel area PXL.

The middle part 300 may include a first TFT TFT_1 electrically connected to the first upper electrode 210 and a second TFT TFT_2 electrically connected to the second lower electrode 115. In this embodiment, the middle part 300 may include a second pad part 340 electrically connected to the first upper electrode 210, a first contact plug 345 connecting between the first upper electrode 210 and the second pad part 340, a third pad part 350 electrically connected to the first pad part 225, and a second contact plug 355 connecting between the first and third pad parts 225 and 350. The second and third pad parts 340 and 350 may have flat bottom surfaces that are substantially identical to the bottom surface of the middle part 300. Additionally, each of the second and third pad parts 340 and 350 may be exposed to be electrically connected to an external circuit.

According to this embodiment, each of the first and second lower electrodes 110 and 115, the second pad part 340 electrically connected to the first upper electrode 210, and the third pad part 350 electrically connected to the second upper electrode 215 may be exposed to in the same direction substantially (for example, the lower surface of the display device) in order to be electrically connected to an external circuit. Through the structure, the protective part 235 of the upper display element 200 may completely protect the upper display element 200.

A forth pad 360 may be provided adjacent to the third pad 350 and may be disposed in the peripheral area PERI. The forth pad 360 may be electrically connected to the first lower electrode 110 through a forth contact plug 365. The forth pad part 360 may have flat bottom surfaces that are substantially identical to the bottom surface of the middle part 300.

FIGS. 4A through 4I are sectional views illustrating a display device according to an embodiment of the inventive concept. The ordinal numbers "first" and "second" described below may be different from the fabricating order and the ordinal numbers "first" and "second" descried with reference to FIG. 2 will be used.

Figure 4A:
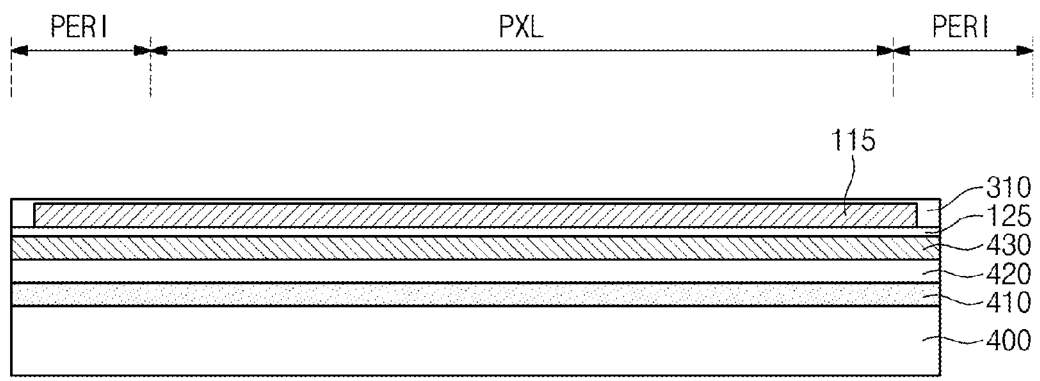
FIGS. 4A through 4I are sectional views illustrating a display device according to an embodiment of the inventive concept.

Referring to FIG. 4A, a separation layer 410, a heat prevention layer 420, an etch stop layer 430, a second alignment layer 125, a second lower electrode 115, and a flat insulation layer 310 may be sequentially formed on a sacrificial substrate 400.

The sacrificial substrate 400 may be a glass substrate. The sacrificial substrate 400 may include a pixel area PXL where the unit pixel is formed and a peripheral area PERI.

The separation layer 410 may be formed of a material that includes amorphous silicon including hydrogen, or silicon such as SiOx and SiNx, or organic polymers such as polyimide having a detachable bond by light irradiation. The separation layer 410 may be formed with a thickness of about 10 nm to about 1 μm, and for example, the separation layer 410 may have a thickness of about 20 nm to about 200 nm.

As heat is generated from the separation layer 410 during laser light incidence, the heat prevention layer 420 prevents the heat from being delivered to the upper part, so that the sacrificial substrate 400 may be separated with small light energy. The heat prevention layer 420 may include an oxide having a small heat conductivity such as SiOx. The heat prevention layer 420 may be formed with a thickness of about 10 nm to about 1 μm, and for example, the heat prevention layer 420 may have a thickness of about 20 nm to about 200 nm.

The etch stop layer 430 may serve to protect the first alignment layer 120 from being damaged by an etchant when the separation layer 410 and the heat prevention layer 420 are removed during a subsequent process. As one example, an acid etchant is used when amorphous silicon (for example, the separation layer 410), a silicon oxide (for example, the separation layer 410), or the heat prevention layer 420 is removed, but since the first alignment layer 120 is easily damaged by the acid etchant, the etch stop layer 430 may be used to suppress the damage.

The etch stop layer 430 typically uses a metal thin layer and the metal thin layer has excellent reflectivity and may prevent a laser to be incident to the driving circuit of the upper display element 200 or the middle part 300 during a subsequent separation process using the laser. The reflected light may be absorbed again by the separation layer 410. Additionally, the metal thin layer may have anti-static effect. The etch stop layer 430 may include at least one of Mo, Al, Ti, and Cr. The etch stop layer 430 may be formed with a thickness of about 10 nm to about 1 μm, and for example, the etch stop layer 430 may have a thickness of about 20 nm to about 200 nm.

As mentioned above, when a metal thin layer is used as the etch stop layer 430, the metal thin layer has excellent heat conductivity but the heat prevention layer 420 may block the light and prevent heat from being delivered to the middle part 300 and the upper display unit 200.

The second alignment layer 125 may help an arrangement direction of liquid crystals to be arranged in a desired direction and for example, may include polyimide. After coating the second alignment layer 125 on the etch stop layer 430, a thermal treatment process may be further performed.

The second lower electrode 115, as a transparent electrode, may include at least one of ITO, IZO, AZO, ZnO, $SnO_2$, $In_2O_3$, metal mash, and graphene. Additionally, the second lower electrode 115 may be used as an anode electrode of the lower display element 100.

The flat insulation layer 310 may be a layer for covering the second lower electrode 115 and planarizing a level difference with the second alignment layer 125 of a portion where the second lower electrode 115 is not formed. The flat insulation layer 310 may include at least one of a silicon oxide, a silicon nitride, and a silicon oxynitride. The flat insulation layer 310 may be omitted.

According to another embodiment of the inventive concept, the heat prevention layer 420 and the etch stop layer 430 may be omitted.

Figure 4B:
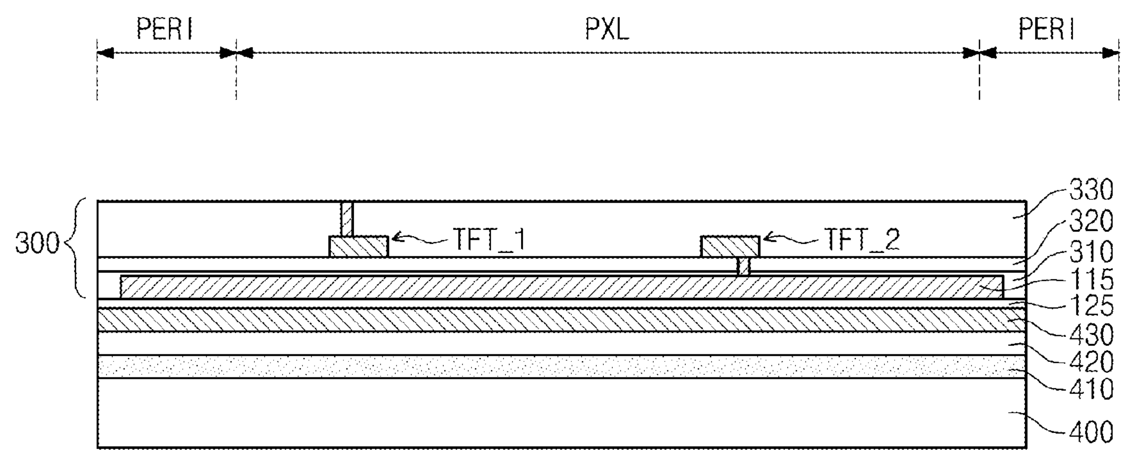

Referring to FIG. 4B, the passivation layer 320, the interlayer insulation layer 330, and the middle part 300 including a driving circuit may be formed on the flat insulation layer 310.

As moisture and gas are generated from the lower display element 100 that is formed subsequently, the passivation layer 320 may prevent the moisture and gas from being flowing into the upper display element 200 or the driving circuit. The passivation layer 320 may have a water vapor permeability of less than 10-6 g/cm$^2$ day. For example, the passivation layer 320 may include at least one of $Al_2O_3$, SiNx, and SiOx. Additionally, it may be a multilayer thin layer including these thin layers. The passivation layer 320 may be formed with a thickness of about 10 nm to about 10 μm, and for example, the passivation layer 320 may have a thickness of about 30 nm to about 1 μm.

A driving circuit may be formed on the passivation layer 320. In this embodiment, a first TFT TFT_1 and a second TFT TFT_2 are shown exemplarily. The second TFT TFT_2 may be electrically connected to the second lower electrode 115.

The interlayer insulation layer 330 may be formed covering the driving circuit. The interlayer insulation layer 330 may include at least one of SiNx, SiOx, and an organic insulation material. The interlayer insulation layer 330 may be formed with a thickness of about 50 nm to about 10 μm, and for example, the interlayer insulation layer 330 may have a thickness of about 100 nm to about 3 μm.

Figure 4C:
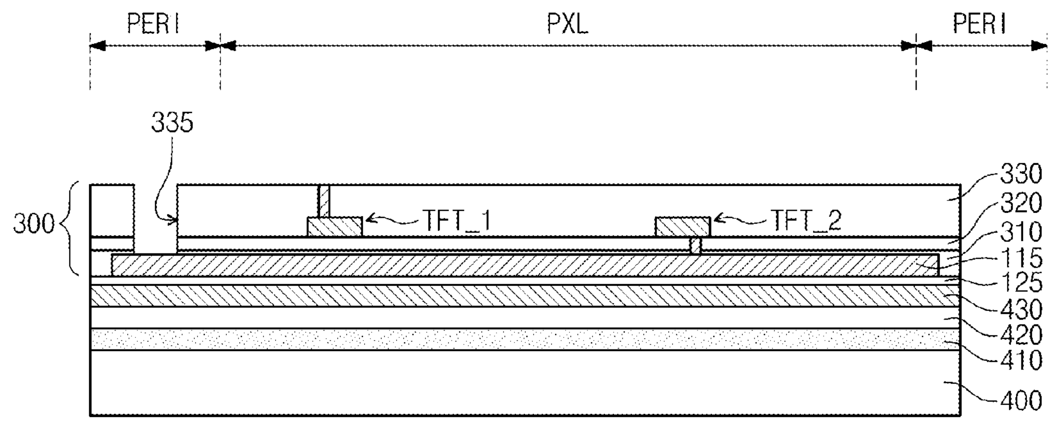

Referring to FIG. 4C, by etching the interlayer insulation layer 330, the passivation layer 320, and the flat insulation layer 310, a contact hole 335 exposing a portion of the second lower electrode 115 in the peripheral area PERI may be formed.

Figure 4D:
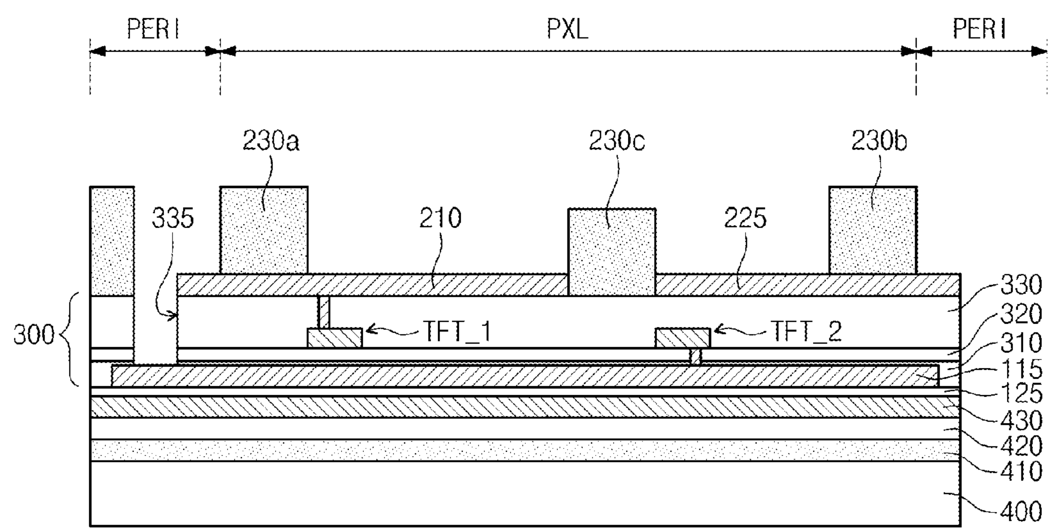

Referring to FIG. 4D, a first upper electrode 210, a pad part 225, and banks 230*a*, 230*b*, and 230*c* may be formed on the interlayer insulation layer 330.

When it is described briefly, after an upper electrode layer is conformally formed on the interlayer insulation layer 330, by etching the upper electrode layer, the first upper electrode 210 and the pad part 225 may be formed. A bank layer may be formed on the first upper electrode 210 and the pad part 225, and the banks 230*a*, 230*b*, and 230*c* may be formed by etching the bank layer. The banks 230*a*, 230*b*, and 230*c* may include pixel banks 230*a* and 230*b* for defining a unit pixel and a separation bank 230*c* disposed between the first upper electrode 210 and the pad part 225.

Figure 4E:
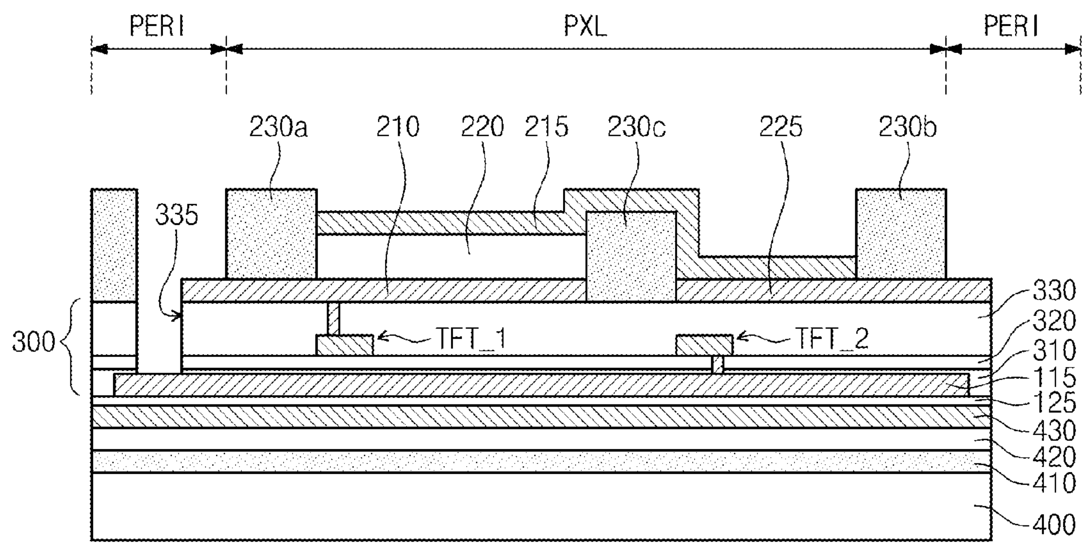

Referring to FIG. 4E, a light emitting part 220 and a second upper electrode 215 may be formed on the first upper electrode 210 where the banks 230*a*, 230*b*, and 230*c* are formed.

When it is described briefly, the light emitting part 220 may be formed filling between one of the pixel banks 230*a* and 230*b* and the separation bank 230*c*. The second upper electrode 215 may be conformally formed on the light emitting part 220, the separation bank 230*c*, and the pad part 225 between the pixel banks 230*a* and 230*b*.

Figure 4F:
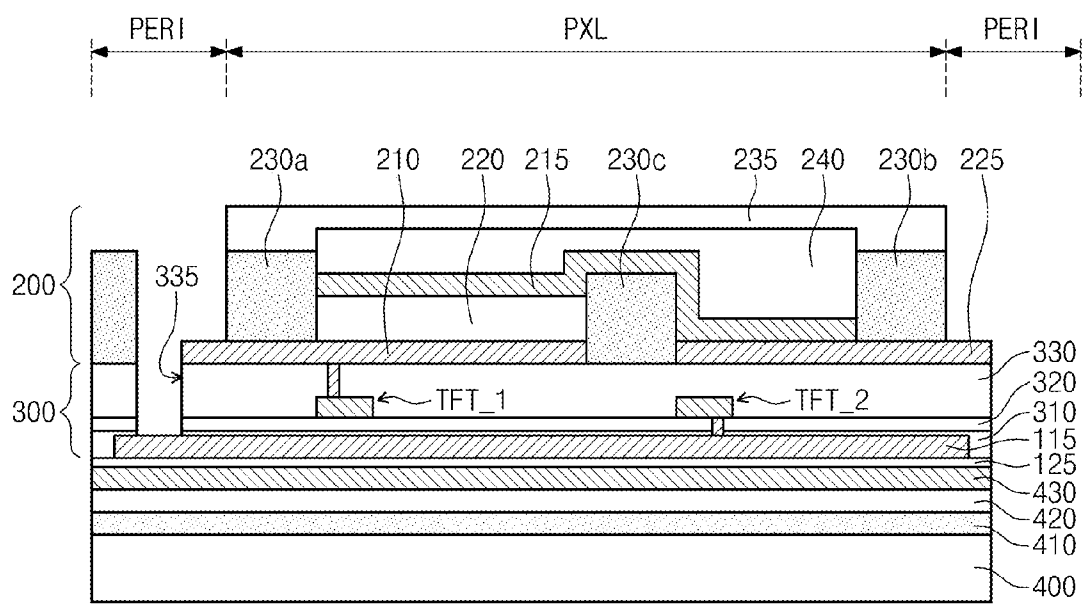

Referring to FIG. 4F, a protective part 235 may be formed on the second upper electrode 215 and the banks 230*a*, 230*b*, and 230*c*. The protective part 235 may be a flat or can-type glass substrate. In this embodiment, the when the can-type glass substrate is used, a hardener 240 may fill a space between the second upper electrode 215 and the protection unit 235. Although not shown in the drawings, a thin film type encapsulation layer may be further formed between the can-type glass substrate and the hardener 240.

Therefore, an upper display element 200 including the first and second upper electrodes 210 and 215, the pad part 225, the light emitting part 220, the banks 230*a*, 230*b*, and 230*c*, and the protective part 235 may be formed on the middle part 300.

As shown in the drawings, in order to expose a portion of the second lower electrode 115, the protective part 235 may not completely cover the upper display element 200.

Figure 4G:
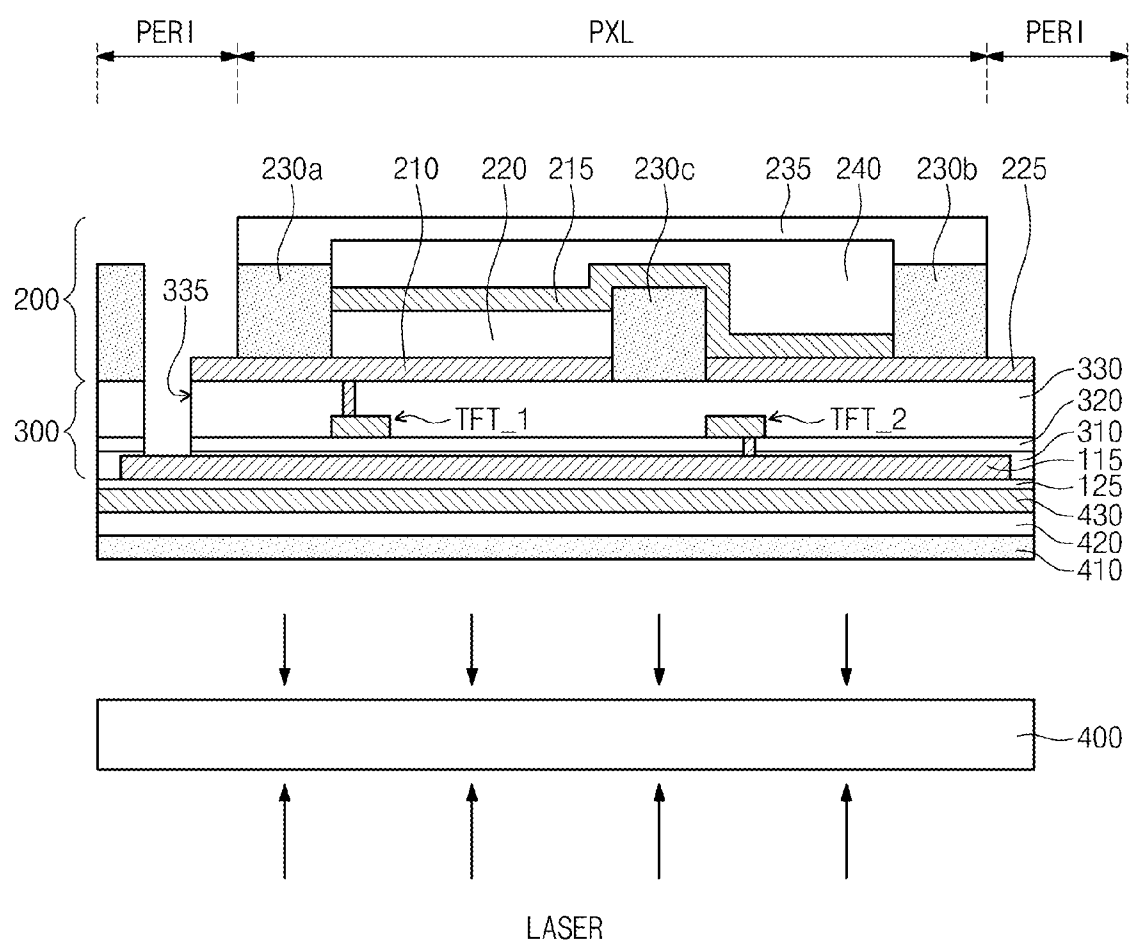

Referring to FIG. 4G, by beaming a laser to the lower part of the sacrificial substrate 400, the sacrificial substrate 400 may be separated.

More specifically described, the beamed laser may be in an energy band of a wavelength with which light absorption is advantageous in the separation layer 410. The wavelength of the beamed light may be in a range of about 100 nm to about 3 μm and preferably may be a short wavelength of about 200 nm to about 400 nm. Additionally, the energy of the beamed light may be used with about 100 mJ/cm$^2$ to about 1,000 mJ/cm$^2$ and the sacrificial substrate 400 may be detached in a low energy.

As one example, the XeCl excimer laser of a 308 nm wavelength may be used. At this point, as most of light with wavelengths penetrates the sacrificial substrate 400, and reaches the separation layer 410 and is absorbed, since gas is generated, the sacrificial substrate 400 may be detached.

Figure 4H:
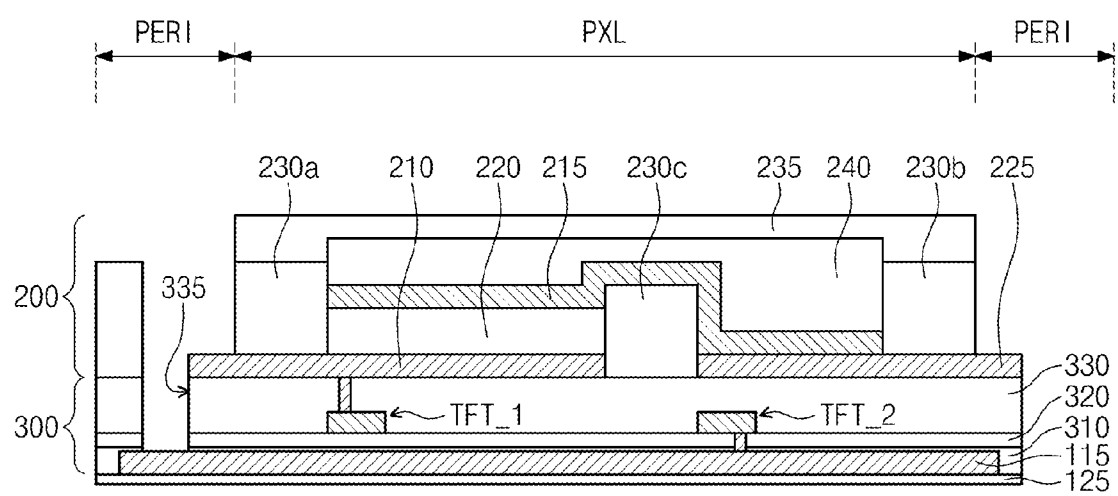

Referring to FIG. 4H, the separation layer 410, the heat prevention layer 420, and the etch stop layer 430 may be removed. For example, the separation layer 410, the heat prevention layer 420, and the etch stop layer 430 may be removed by using wet etching. At this point, when the etch stop layer 430 is removed, an alkaline etchant may be used to suppress the damage of the second alignment layer 125.

Figure 4I:
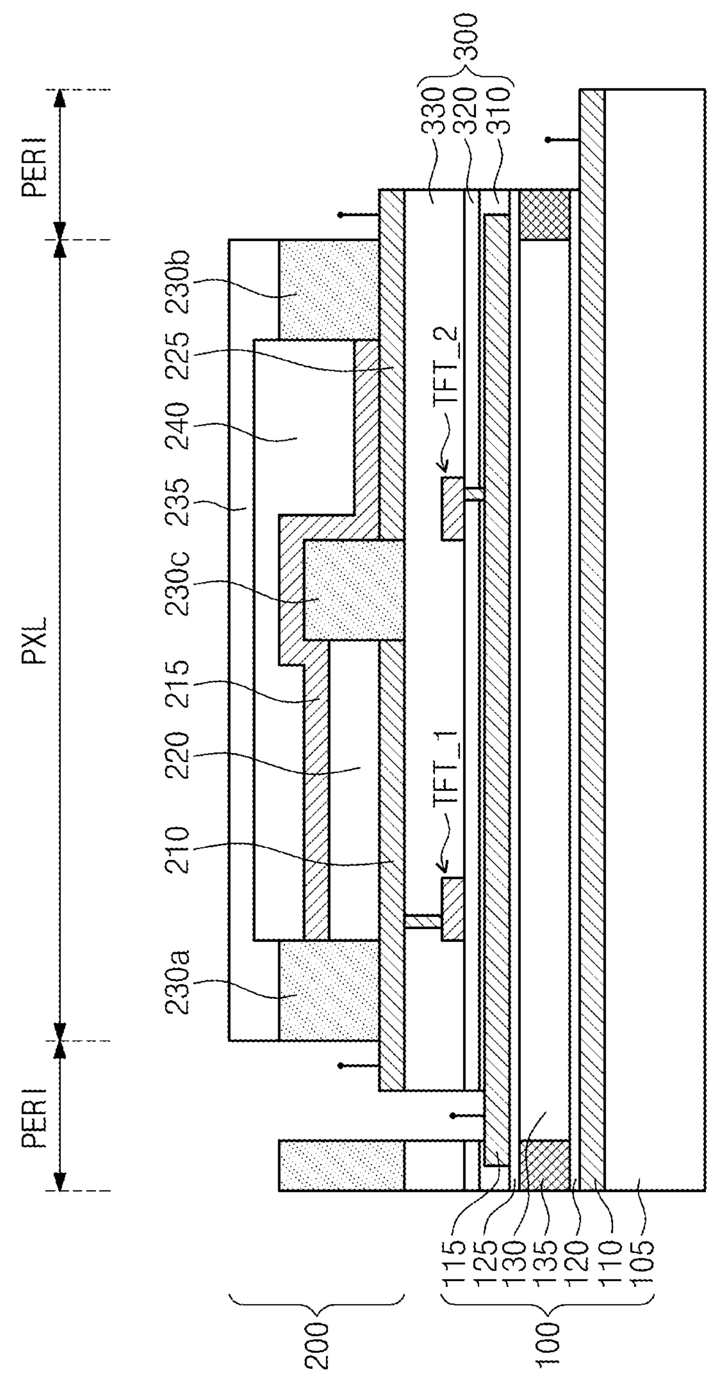

Referring to FIG. 4I, a structure where the substrate 105, the first lower electrode 110, the first alignment layer 120, the liquid crystal part 130, and the sealant 135 are formed may be coupled to below the second alignment layer 125. Therefore, the lower display element 100 including the substrate 105, the first and second lower electrodes 110 and 115, the first and second alignment layers 120 and 125, the liquid crystal part 130, and the sealant 135 may be completed.

Figure 5A:
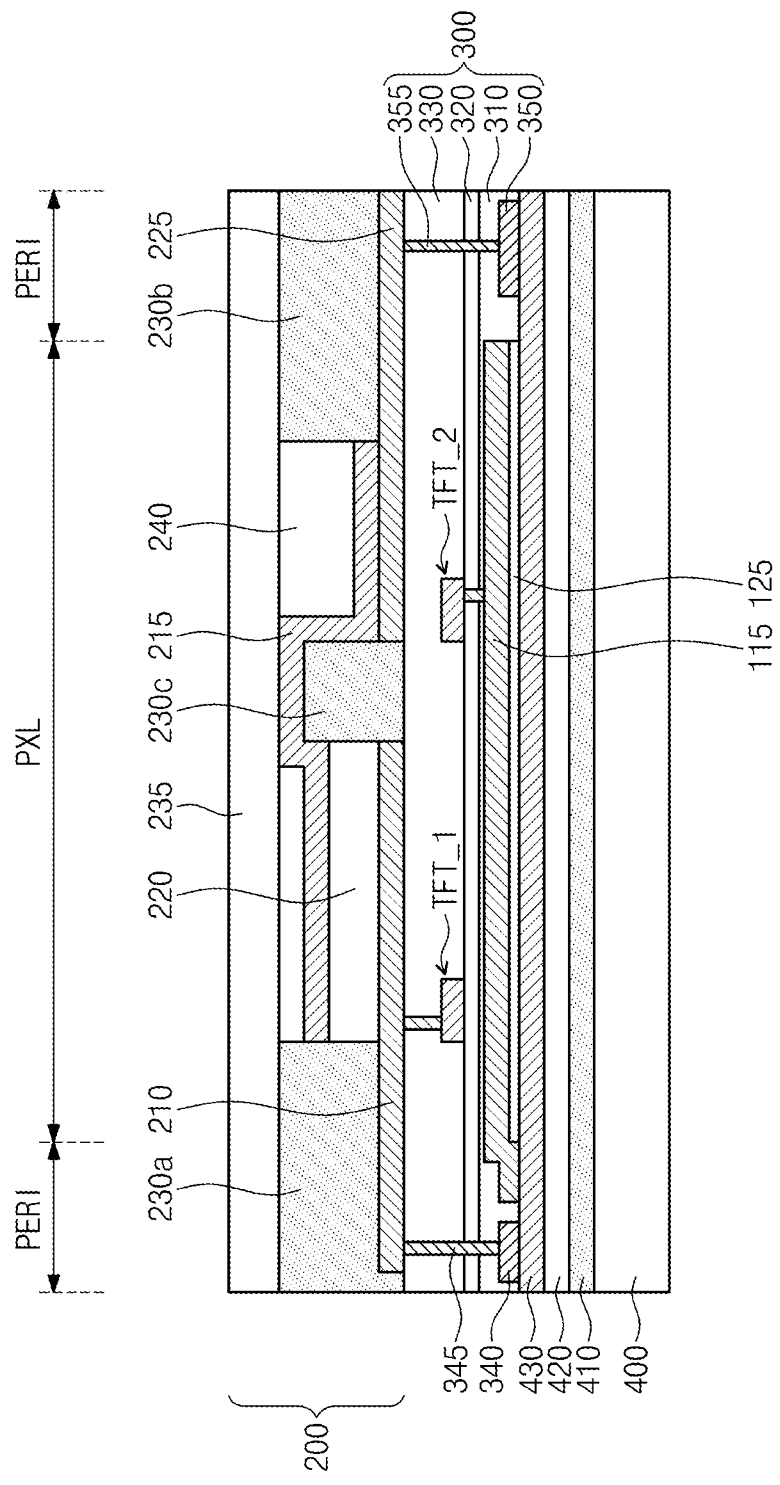
FIGS. 5A through 5C are sectional views illustrating a display device according to another embodiment of the inventive concept.
Figure 5B:
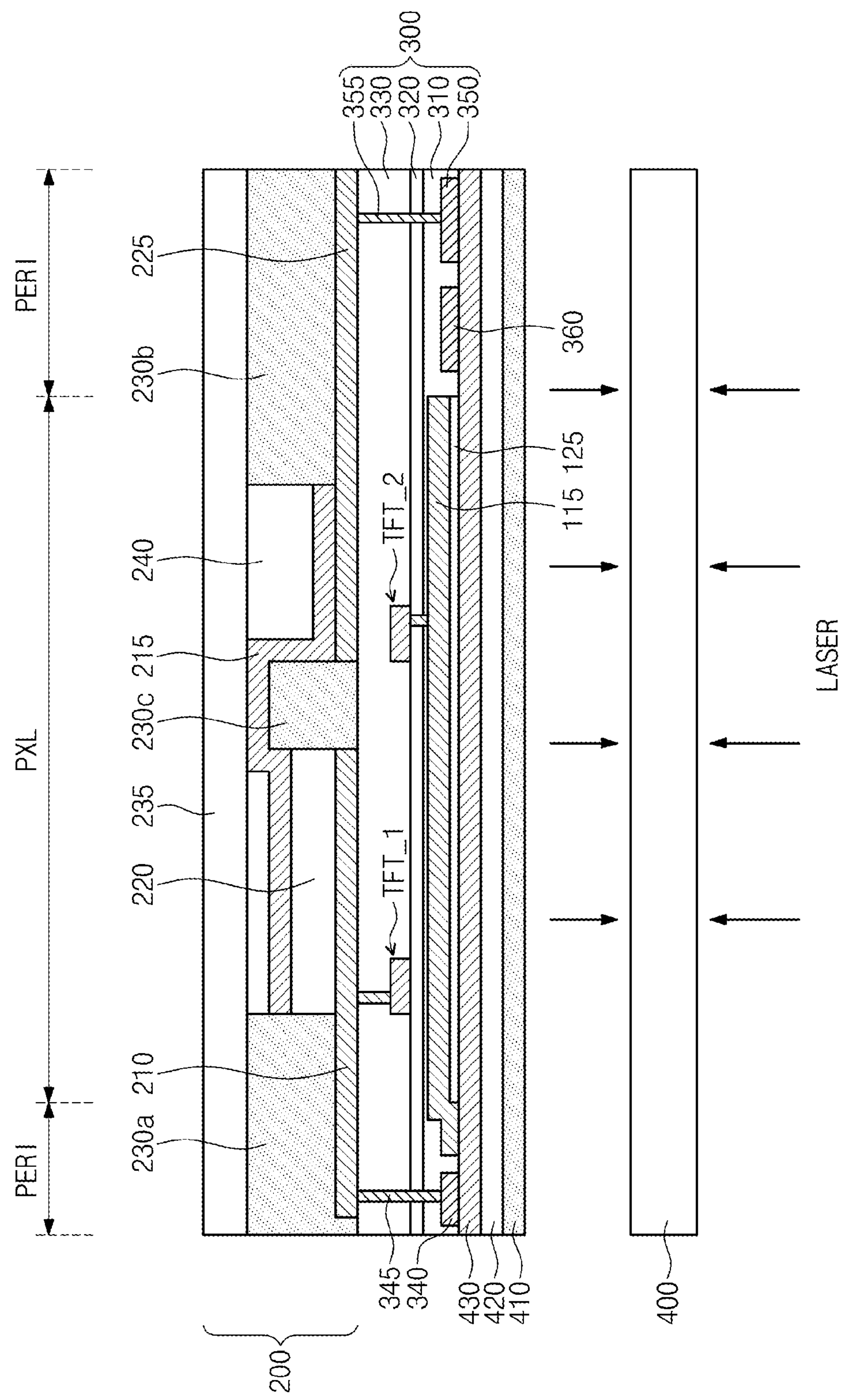
Figure 5C:
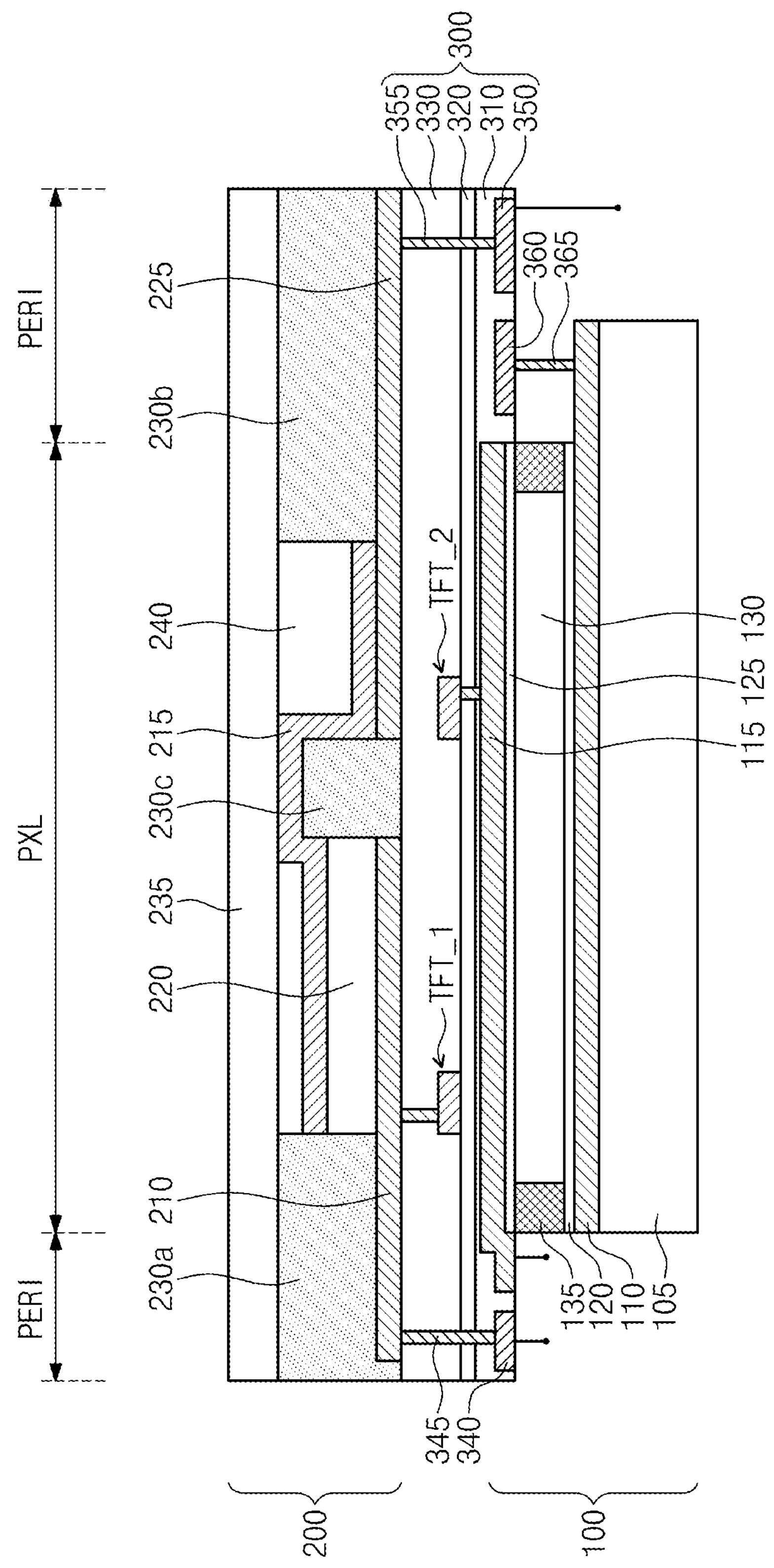

FIGS. 5A through 5C are sectional views illustrating a method of fabricating a display device according to another embodiment of the inventive concept.

Referring to FIG. 5A, a separation layer 410, a heat prevention layer 420, an etch stop layer 430, a second alignment layer 125, a second lower electrode 115, a middle part 300, and an upper display element 200 may be sequentially formed on a sacrificial substrate 400.

More specifically described, a process for forming the separation layer 410, the heat prevention layer 420, the etch stop layer 430, and the second alignment layer 125 on the sacrificial substrate 400 is substantially identical to that described above with reference to FIG. 4A and thus its description will be omitted.

After a conductive layer is conformally formed on the etch stop layer 430 and the second alignment layer 125, by etching a conductive layer, a second pad part 340, the second lower electrode 115, a third pad part 350, and a forth pad part 360 may be formed separately.

A flat insulation layer 310 and a passivation layer 320 may be sequentially formed to cover the second lower electrode 115 and the second to fourth pad parts 340, 350 and 360. A driving circuit may be formed on the passivation layer 320 and an interlayer insulation layer 330 may be formed to cover the driving circuit. A process for forming the flat insulation layer 310, the passivation layer 320, the driving circuit, and the interlayer insulation layer 330 is substantially identical to that described with reference to FIG. 4B and thus its detailed description will be omitted.

A first contact plug 345 and a second contact plug contact 355 penetrating the interlayer insulation layer 330, the passivation layer 320, and the flat insulation layer 310 to be electrically connected to the second and third pad parts 340 and 350, respectively, may be formed separately.

A first upper electrode 210, a first pad part 225, banks 230*a*, 230*b*, and 230*c*, a light emitting part 220, and a second upper electrode 215 may be formed on the interlayer insulation layer 330. A process for forming he first and second upper electrodes 210 and 215, the first pad part 225, the banks 230*a*, 230*b*, and 230*c*, and the light emitting part 220 is substantially identical to that described with reference to FIGS. 4D and 4E, and thus its detailed description will be omitted.

A protective part 235 may be formed on the second upper electrode 215 and the pixel banks 230*a* and 230*b*. The protective part 235 may be formed to completely cover the peripheral area PERI from the pixel area PXL. A process for forming the protective part 235 on the second upper electrode 215 and the banks 230*a*, 230*b*, and 230*c* refers to FIG. 4F.

Referring to FIG. 5B, by beaming a laser or by using an etchant to the lower part of the sacrificial substrate 400, the sacrificial substrate 400 may be separated.

Since the protection unit 235 covers and support the entire upper display element, after the sacrificial substrate 400 is separated through the laser beaming, the upper display element 200 may be maintained stably. Accordingly, the damage of the upper display element 200 may be suppressed.

As described with reference to FIGS. 4G through 4H, the sacrificial substrate 400, the separation layer 410, the heat prevention layer 420, and the etch stop layer 430 may be removed.

Referring to FIG. 5C, a structure where the substrate 105, the first lower electrode 110, the first alignment layer 120, the liquid crystal part 130, and the sealant 135 are formed may be coupled to below the second alignment layer 125. Therefore, the lower display element 100 including the substrate 105, the first and second lower electrodes 110 and 115, the first and second alignment layers 120 and 125, the liquid crystal part 130, and the sealant 135 may be completed.

According to various embodiments of the inventive concept, as one middle part drives the upper and lower display elements together, an incidental middle part may be omitted, so that the entire thickness of the display device may be reduced. Additionally, image distortion due to an optical gap between the upper and lower display elements is reduced by the omitted incidental middle part, so that the image quality of the display device may be improved. Furthermore, the cost of fabricating the display device may be reduced.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display device comprising:

a lower display element including a substrate, a first lower electrode, a liquid crystal part, and a second lower electrode that are sequentially stacked;

an upper display element including a first upper electrode, a light emitting part, a second upper electrode, and a protective part that are sequentially stacked; and a middle part configured to transmit a driving signal to the lower and upper display elements, wherein the lower display element, the middle part, and the upper display element are sequentially stacked.

2. The display device of claim 1, wherein:

the upper display element further comprises banks defining a space where the light emitting part is disposed; and the protective part is disposed on the banks and covers a pixel area where the light emitting part is disposed.

3. The display device of claim 1, wherein the protective part covers the entire upper display element.

4. The display device of claim 1, wherein the protective part has a flat or can-type structure.

5. The display device of claim 1, further comprising a thin film type encapsulation layer disposed between the protective part and an upper part of the upper display element.

6. The display device of claim 1, further comprising a hardener filling an empty space between a thin film type encapsulation layer and an upper part of the upper display element.

7. The display device of claim 1, wherein one surface of the first lower electrode and one surface of the second lower electrode are exposed and the exposed surfaces of the first and second lower electrodes are disposed in a peripheral area.

8. The display device of claim 7, wherein one surface of the first upper electrode is exposed and the exposed surface of the first upper electrode is disposed in the peripheral area, the device further comprising a pad part electrically connected to the second upper electrode, and wherein one surface of the pad part is exposed and the exposed surface of the pad part is disposed in the peripheral area.

9. The display device of claim 8, wherein the exposed surfaces of the first and second lower electrodes, the exposed surface of the first upper electrode, and the exposed surface of the pad part are exposed toward an upper surface of the display device.

10. The display device of claim 1, wherein:

an upper surface of the first lower electrode are exposed;

one surface of the second lower electrode is exposed; and the exposed surfaces of the first and second lower electrodes are disposed in a peripheral area.

11. The display device of claim 10, further comprising:

a first pad part electrically connected to the first upper electrode, one surface of the first pad being exposed;

a second pad part electrically connected to the second upper electrode, one surface of the second pad part being exposed; and a third pad part electrically connected to the first lower electrode.

12. The display device of claim 11, wherein the exposed surface of the second lower electrode and the exposed surfaces of the first and second pads face a bottom surface of the display device.

13. The display device of claim 1, wherein the middle part includes a first transistor and a second transistor, the first transistor being electrically connected to the first upper electrode of the upper display element, the second transistor being electrically connected to the second lower electrode of the lower display element.

14. The display device of claim 1, wherein the driving signal includes a first driving signal and a second driving signal, and wherein the middle part includes a first transistor and a second transistor, the first transistor transmitting the first driving signal to the first upper electrode of the upper display element, the second transistor transmitting the second driving signal to the second lower electrode of the lower display element.

15. The display device of claim 1, wherein the first lower electrode of the lower display element is a transparent electrode.

16. The display device of claim 1, further comprising:

a pad part electrically connected to the second upper electrode; and a separation bank disposed between the first upper electrode and the pad part, wherein a bottom surface of the second upper electrode contacts a top surface of the light emitting part, a top surface and a sidewall of the separation bank, and a top surface of the pad part.

* * * * *